US007490106B2

(12) United States Patent
Dumitru et al.

(10) Patent No.: US 7,490,106 B2
(45) Date of Patent: Feb. 10, 2009

(54) MULTIDIMENSIONAL DATABASE SUBCUBES

(75) Inventors: Marius Dumitru, Issaquah, WA (US); Amir Netz, Bellevue, WA (US); Mosha Pasumansky, Redmond, WA (US); Cristian Petculescu, Redmond, WA (US); Richard R. Tkachuk, Sammamish, WA (US); Paul J. Sanders, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/137,233

(22) Filed: May 25, 2005

(65) Prior Publication Data

US 2006/0010114 A1    Jan. 12, 2006

Related U.S. Application Data

(60) Provisional application No. 60/586,586, filed on Jul. 9, 2004.

(51) Int. Cl.
*G06F 7/00* (2006.01)
(52) U.S. Cl. ........................................ 707/104.1; 707/3
(58) Field of Classification Search ............... 707/3, 707/101, 102, 103, 4, 10, 104.1
See application file for complete search history.

(56) References Cited

U.S. PATENT DOCUMENTS

| | | | |
|---|---|---|---|
| 5,293,615 A | 3/1994 | Amada | |
| 5,767,854 A | 6/1998 | Anwar | |
| 5,855,018 A * | 12/1998 | Chor et al. | ...................... 707/9 |
| 5,878,423 A | 3/1999 | Anderson et al. | |
| 5,918,232 A * | 6/1999 | Pouschine et al. | ....... 707/103 R |
| 5,920,867 A * | 7/1999 | Van Huben et al. | ......... 707/101 |
| 5,930,762 A | 7/1999 | Masch | |
| 5,969,974 A | 10/1999 | Vandenbelt et al. | |
| 5,970,482 A | 10/1999 | Pham et al. | |
| 5,970,493 A | 10/1999 | Shoup et al. | |
| 5,974,572 A | 10/1999 | Weinberg et al. | |
| 6,006,223 A | 12/1999 | Agrawal et al. | |
| 6,044,219 A | 3/2000 | Lips | |
| 6,078,918 A | 6/2000 | Allen et al. | |
| 6,108,640 A | 8/2000 | Slotznick | |
| 6,108,647 A * | 8/2000 | Poosala et al. | .................. 707/1 |
| 6,122,636 A * | 9/2000 | Malloy et al. | ............... 707/102 |
| 6,330,564 B1 * | 12/2001 | Hellerstein et al. | .......... 707/101 |

(Continued)

OTHER PUBLICATIONS

OLE DB for Data Mining Specification Version 1.0. Microsoft Corporation, Jul. 2000. 133 pgs.

(Continued)

*Primary Examiner*—Jean M Corrielus
*Assistant Examiner*—Mohammed R Uddin
(74) *Attorney, Agent, or Firm*—Amin, Turocy & Calvin, LLP

(57) ABSTRACT

The subject invention pertains to interaction with multidimensional data. More specifically, interactions can be constrained to a limited subset of a multidimensional data cube, namely a subcube. Subsequent to or concurrently with subcube creation, query execution or other interactions such as calculations can be consolidated or restricted to the smaller subcube query space rather than the typically enormous main cube. Multiple subcubes can also be created and nested to gradually reduce the query space. Deletion of one subcube can cause a reversion back to a previously defined or hierarchical parent subcube.

9 Claims, 12 Drawing Sheets

U.S. PATENT DOCUMENTS

| | | | |
|---|---|---|---|
| 6,430,545 B1 * | 8/2002 | Honarvar et al. | 706/47 |
| 6,470,352 B2 | 10/2002 | Yaginuma | |
| 6,477,538 B2 | 11/2002 | Yaginuma et al. | |
| 6,549,907 B1 * | 4/2003 | Fayyad et al. | 707/101 |
| 6,606,621 B2 * | 8/2003 | Hopeman et al. | 707/3 |
| 6,651,055 B1 * | 11/2003 | Kilmer et al. | 707/3 |
| 6,662,195 B1 | 12/2003 | Langseth et al. | |
| 6,675,356 B1 | 1/2004 | Adler et al. | |
| 6,694,322 B2 * | 2/2004 | Warren et al. | 707/101 |
| 6,721,715 B2 | 4/2004 | Nemzow | |
| 6,853,994 B1 * | 2/2005 | Gupta | 707/6 |
| 6,898,603 B1 * | 5/2005 | Petculescu et al. | 707/101 |
| 6,973,491 B1 * | 12/2005 | Staveley et al. | 709/224 |
| 6,990,480 B1 * | 1/2006 | Burt | 707/1 |
| 7,007,020 B1 | 2/2006 | Chen et al. | 707/6 |
| 7,062,479 B2 * | 6/2006 | Edmunds et al. | 707/1 |
| 7,062,757 B2 * | 6/2006 | Honarvar et al. | 717/127 |
| 7,076,475 B2 * | 7/2006 | Honarvar | 706/47 |
| 7,089,266 B2 * | 8/2006 | Stolte et al. | 707/104.1 |
| 7,171,406 B2 * | 1/2007 | Chen et al. | 707/3 |
| 7,181,438 B1 * | 2/2007 | Szabo | 707/2 |
| 7,181,440 B2 * | 2/2007 | Cras et al. | 707/2 |
| 7,222,130 B1 * | 5/2007 | Cras et al. | 707/103 R |
| 2001/0011241 A1 | 8/2001 | Nemzow | |
| 2001/0054034 A1 * | 12/2001 | Arning et al. | 707/1 |
| 2002/0032609 A1 | 3/2002 | Wilkman | |
| 2002/0103807 A1 * | 8/2002 | Yamashita | 707/101 |
| 2002/0111934 A1 | 8/2002 | Narayan | |
| 2002/0194163 A1 * | 12/2002 | Hopeman et al. | 707/3 |
| 2003/0023463 A1 | 1/2003 | Dombroski et al. | |
| 2003/0046303 A1 * | 3/2003 | Chen et al. | 707/104.1 |
| 2003/0105658 A1 * | 6/2003 | Chen et al. | 705/10 |
| 2003/0115194 A1 * | 6/2003 | Pitts et al. | 707/3 |
| 2004/0003132 A1 * | 1/2004 | Stanley et al. | 709/316 |
| 2004/0034616 A1 * | 2/2004 | Witkowski et al. | 707/1 |
| 2004/0064456 A1 * | 4/2004 | Fong et al. | 707/100 |
| 2004/0103092 A1 * | 5/2004 | Tuzhilin et al. | 707/3 |
| 2004/0111428 A1 | 6/2004 | Rajan et al. | |
| 2004/0139061 A1 * | 7/2004 | Colossi et al. | 707/3 |
| 2004/0188998 A1 | 9/2004 | Henthorn | |
| 2004/0236767 A1 * | 11/2004 | Soylemez et al. | 707/100 |
| 2005/0015360 A1 * | 1/2005 | Cras et al. | 707/2 |
| 2005/0165733 A1 * | 7/2005 | Strovink | 707/2 |
| 2005/0177553 A1 * | 8/2005 | Berger et al. | 707/3 |
| 2005/0222972 A1 * | 10/2005 | Mishra et al. | 707/1 |
| 2005/0222992 A1 * | 10/2005 | Kondo et al. | 707/3 |
| 2006/0010157 A1 * | 1/2006 | Dumitrascu et al. | 707/102 |
| 2007/0118501 A1 * | 5/2007 | Yan | 707/2 |

OTHER PUBLICATIONS

Blakeley. "Data access for the Masses Through OLE DB", SIGMOD '96, ACM, Jun. 1996, pp. 161-172.

Microsoft OLE DB for OLAP: Programmer's Reference, Microsoft Corporation, Dec. 1998.

OA Dated Aug. 29, 2008, for U.S. Appl. No. 11/054,302, 31 pages.

* cited by examiner

MULTIDIMENSIONAL DATABASE SUBCUBES

CROSS-REFERENCE TO RELATED APPLICATIONS

This application claims the benefit of U.S. Provisional Application Ser. No. 60/586,586, filed Jul. 9, 2004, entitled SYSTEMS AND METHODS OF CUSTOMIZING DATABASES. The entirety of this application is incorporated herein by reference.

TECHNICAL FIELD

The subject invention relates generally to databases and more particularly toward multidimensional database systems and methods

BACKGROUND

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model. Conceptually in multidimensional database systems, data is represented as cubes with a plurality of dimensions and measures, rather than relational tables with rows and columns. A cube includes groups of data such as three or more dimensions and one or more measures. Dimensions are a cube attribute that contains data of a similar type. Each dimension has a hierarchy of levels or categories of aggregated data. Accordingly, data can be viewed at different levels of detail. Measures represent real values, which are to be analyzed. The multidimensional model is optimized to deal with large amounts of data. In particular, it allows users execute complex queries on a data cube. OLAP is almost synonymous with multidimensional databases.

OLAP is a key element in a data warehouse system. OLAP describes category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool sees the data as multidimensional. HOLAP (Hybrid OLAP) is an amalgam of both MOLAP and ROLAP.

Multidimensional databases and other databases modeled as multidimensional employ a multidimensional query language such as MDX (MultiDimensional eXpressions) to retrieve and interact with data. More specifically, data can be retrieved utilizing the query language to define or describe specifically the data to be retrieved, for example employing select, where and from clauses. Subsequently, an execution engine receives the query definition and returns the requested data.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns multidimensional database cube interaction. Data cubes typically encompass an enormous data space. However, interactions with the cube generally pertain to a much smaller data space. The subject invention provides systems and methods to limit the cube space to a smaller subset thereof. This can be accomplished by generating a subcube on which operations can be performed. Such a subcube can be generated by a database management system and/or process component upon receipt of a statement or instruction specifying the subcube. The generated subcube can then restrict the data space of subsequent statements including but not limited to queries. Furthermore, subcubes can be nested thereby providing for incremental limitation of the data space.

According to an aspect of the invention, subcubes can be specified with a select statement. The select statement can be embedded in a subcube creation statement or alternatively in a query statement. The query statement, or subselect, can therefore include nested select statements which inline subcube creation with a query.

In accordance with another aspect of the invention, there can be different types of subcubes including but not limited to session subcubes and query subcubes. Session subcubes restrict the data space upon creation until they are deleted or dropped. Query subcubes restrict the data space with respect to a single query. This can correspond to a subselect statement.

Generated subcubes can influence calculations in accordance with an aspect of the invention. Calculated members, measures, cells and the like are restricted to operating on data within a subcube data space. However, in accordance with another aspect of the invention, calculations can employ data outside the cube, when explicitly referenced, to ensure calculation correctness.

In accordance with an yet another aspect of the invention, a multidimensional database system is provided that includes a subcube that identifies a subset of data stored in a multidimensional cube and a process component that processes one or more statements against the subcube. In accordance with a specific aspect of the invention, the statements can be MDX statements specifying queries, subcube creation, subcube deletion, and the like.

In accordance with still another aspect of the invention, a method of multidimensional data interaction is disclosed that includes receiving a multidimensional database query, executing the query on a subcube and returning the result of the query execution.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
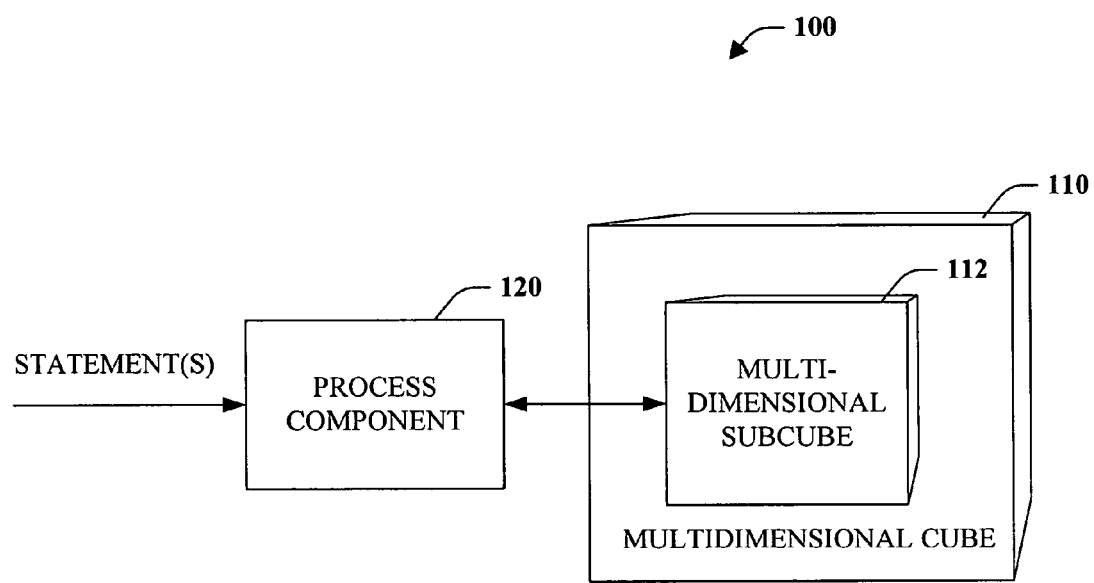
FIG. 1 is a block diagram of a multidimensional data cube interaction system in accordance with an aspect of the subject invention.

Turning initially to FIG. 1, a multidimensional data cube interaction system 100 is illustrated in accordance with an aspect of the subject invention. Among other things, system 100 can include a multidimensional cube 110, a subcube 112, and a process component 120. A cube 110 (also referred to as a multidimensional array and hypercube) is a multidimensional structure comprising a set of data organized in cells by dimensions and measures. This differs from the relational database paradigm where the storage structure is a table comprising a set of data organized by rows and columns. One or more cubes 110 define a multidimensional database.

Cube space can be defined by the cross product of its dimension attributes and can be extremely large. An attribute to a dimension is akin to what a column is to a table in a relational database. For example, a customer dimension can have attributes such as name, phone number, gender, city, state, etc. Attributes themselves can be exposed to users via attribute hierarchies. A dimension includes a hierarchy that includes an optional all level and the distinct members of the attribute. In the customer dimension example, there could be a name attribute hierarchy with two levels: the all level and a second level with a member for each name. Parent child hierarchies can be handled differently. The attribute hierarchies completely define the space of a cube thus: Cube space=$\pi a_i$.members. However, it should be appreciated that attribute hierarchies are not required per attribute. If an attribute hierarchy is not created, the space of the cube is independent of the attribute. For example, an attribute hierarchy is typically not created for the attribute phone number because there is generally little demand to be able to navigate a dimension by phone numbers. If this is done, the attribute can be used as a member property rather than a level in a user hierarchy.

The value of a cell is defined by its attribute hierarchy coordinates and passes. The value of the cell does not change depending on navigational path or the presence of user hierarchies. Thus, the cell value is navigationally invariant. For example, the cell defined by user hierarchy Geography Customer.Geography.USA.WA.Redmond.Richard is identical to the cell defined by attribute hierarchies (Customer.Country.USA, Customer.State.WA, Customer.City.Redmond, Customer.Name.Richard). In the second example, the cell at coordinate Customer.Name.Richard is not the same coordinate as Customer.Geography.USA.Redmond.Richard. Even though the customer Richard lives in Redmond, Wash., USA, the coordinate Customer.Name.Richard does not imply any coordinate in City, State, or Country attributes.

A subcube 112 is a subset of a cube's space. More specifically, a subcube can be defined as collection of tuples that restrict the space for subsequent statements to or interactions with the subspace. A tuple is composed of an ordered collection of one member from one or more dimensions that defines and identifies a cube cell. The tuple is employed to identify specific sections of multidimensional data from a cube. Thus, cube 110 is a collection of cells and the subcube 112 is a smaller subset of those cells.

Process component 120 receives and executes statements on subcube 112 as well as cube 110. Since the subject system 100 pertains to multidimensional data not relational data, statements can be received in a multidimensional query language for referencing cells in multiple dimensions (e.g., more than two). According to an aspect of the invention, statements can be specified in MDX (MultiDimensional eXpressions). The statements can pertain to queries or other interactions with a subcube 112 and/or cube 110.

Figure 2:
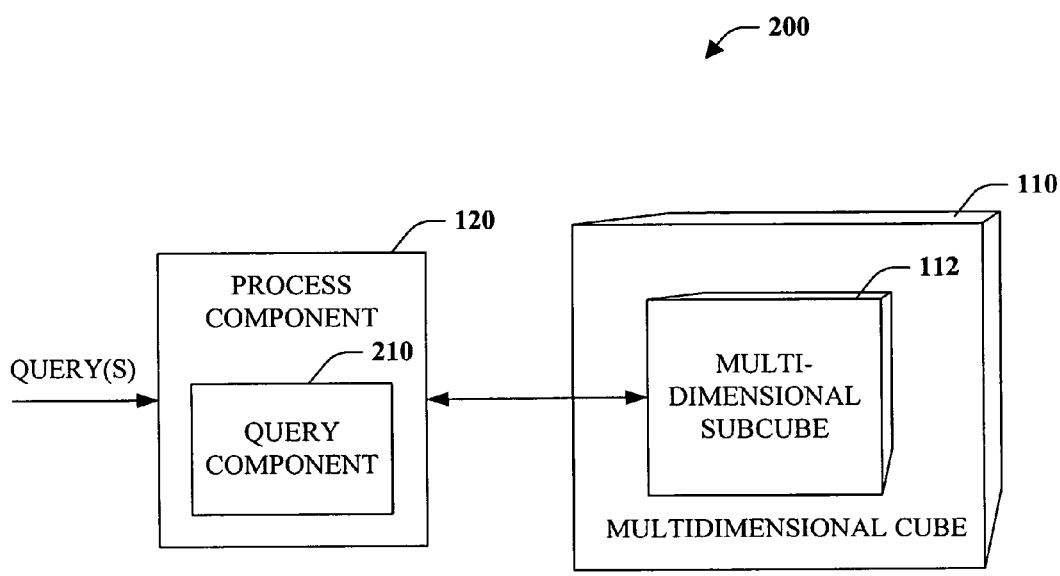
FIG. 2 is a block diagram of a multidimensional cube interaction system including a query component in accordance with an aspect of the subject invention.

FIG. 2 depicts a multidimensional cube interaction system 200 in accordance with an aspect of the subject invention. Similar to system 100 of FIG. 1, system 200 can include a multidimensional cube 110, a subcube 112 and a process component 120. As described supra, the cube 110 is a multidimensional structure for organizing data. One or more cubes 110 comprise a multidimensional database or data warehouse. Subcube 112 comprises a subset of cube 110. More particularly, the subcube 112 is a collection of tuples that restricts the space for subsequent statements to or interactions with the subspace, where tuples identify specific sections or cells of multidimensional data. Furthermore, system 200 can include a process component 120. Process component 120 is operable to receive and execute programmatic statements as well as return data. Here, process component 120 includes a query component 210. Query component 210 can facilitate processing of received query statements. In particular, query component 210 can execute queries and retrieve result sets from the subcube 112 and/or the cube 110. Such queries or query statement can be received in a multidimensional query language such as MDX. Each MDX query can include a data request for example using the select keyword, a starting point employing the from keyword, and optionally a filter utilizing the where keyword. For example, the query statement can take the form of Select <some measures> from <subcube>. Upon execution of the query on the subcube, a result set comprising one or more cells that satisfy the query are returned. As will be further discussed in later sections, the existence of the subcube can operate to limit the query scope to that of the particular subcube. Furthermore, it should be noted that a query could be executed that returns the members of a subcube defined with an arbitrary shape for example by executing a query command in the form of:

Exists(attribute.Members, <arbitrary shaped subcube>) or the like.

Figure 3:
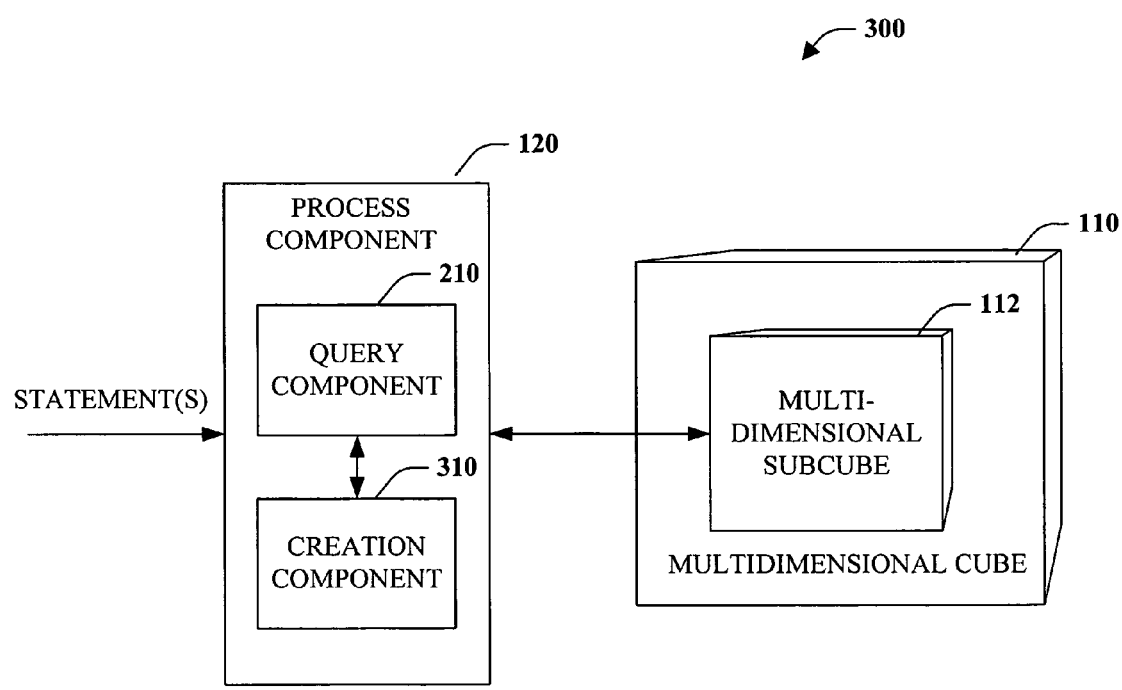
FIG. 3 is a block diagram of a multidimensional cube interaction system including a creation component in accordance with an aspect of the subject invention.

FIG. 3 depicts a multidimensional cube interaction system 300 in accordance with an aspect of the subject invention. Similar to systems 100 and 200 of FIGS. 1 and 2, system 300 can include a multidimensional cube 110, a subcube 112 and a process component 120 including a query component 210. Furthermore, system 300 can include a creation component 310. As described above, the cube 110 is a multidimensional structure for organizing data. One or more cubes 110 comprise a multidimensional database or data warehouse. Subcube 112 comprises a subset of cube 110 and process component 120, for instance through query component 210, can execute and retrieve result sets from the subcube 112 as well as the cube 110. Process component 120 can also include a creation component 310. Creation component 310 can facilitate generation of a subcube 112 from the cube 110. The generated subcube 112 can comprise a subset of cells from cube 110. More particularly, the subcube 112 is a collection of tuples that restricts the space for subsequent statements to or interactions with the subspace, where tuples identify specific sections or cells of multidimensional data. The subcube 112 generated by creation component 310 is dependent upon and initiated by a received expression or statement. For example, a user, application, or other entity could specify an expression received by the creation component 210 in the form Create subcube <SubcubeName> as <select statement>. SubcubeName can identify the name of the newly created subcube. The select statement defines the bounds of the subcube and can be in a form such as Select <subcube> from <CubeName>. By way of example, if there is a sales cube including the dimensions country, product, and time, a subcube could be created on the sales cube that is limited to the United States thereby excising other countries from the cube such as Canada and Mexico. Furthermore, nested subcubes can be generated in accordance with an aspect of the invention. In this manner, there can be a gradual reduction in the cube space. The creation component 310 can generate such nested subcubes upon receipt of an expression or statement. Such statement can be in the form of Create subcube <SubcubeName> as Select <subcube1> from (<Select <subcube2> from <CubeName>). With respect to the above example, the subcube limited to the sales in the United States can be further limited to sales in the United States within the last two years for product X. Furthermore, it should be appreciated that subcubes that cross attribute grain can be decomposed into their lowest common granularity, for example ({Geography.USA, Geography.BC})=({Geography.USA.[State Province].members, Geography.BC}).

Query component 210 and creation component 310 can interact with each other to facilitate processing of hybrid statements including both a query and subcube creation. Such hybrid statements can include subselects. A subselect is a query statement that includes an in-lined subcube definition. With a subselect, select statements can be nested such that a statement includes one or more select statements to define a subcube to be operated on and a select statement to query the subspace defined by the one or more other select statements. The subcube can be specified in the where clause of a select statement. For example, the statement can be specified in the form Select <measure(s)> from <cube> where <subcube select statement(s)>. From the subcube select statement, a subcube can be generated for example in memory. It should also be appreciated that the subcube specified and thereby generated does not need to be specified with one or more select statements. Many other means are contemplated by the subject invention. For instance, a subcube can also be specified by cube cells or tuples identifying such cells. These cells or set of cells can also be specified in the where clause thereby limiting the query scope.

Creation component 310 can also generate different types of subcubes, namely session subcubes and/or or query subcubes. Session and query subcubes vary temporally. Session subcubes are created and from the time of creation until deletion (as described infra), queries are executed by processor 120 through query component 210 against the generated subcube, rather than the main cube 110. Alternatively, there can be query subcubes. In this situation, the subcube is only instantiated for the duration of a query. This corresponds to a multidimensional subselect. In this case, an expression would correspond to two select statements, one defining a subcube and one selecting cells from the subcube. To effectuate the temporal aspects of the different subcubes either or both of query component 210 and creation component 310 can interact with a deletion component as described hereinafter.

Figure 4:
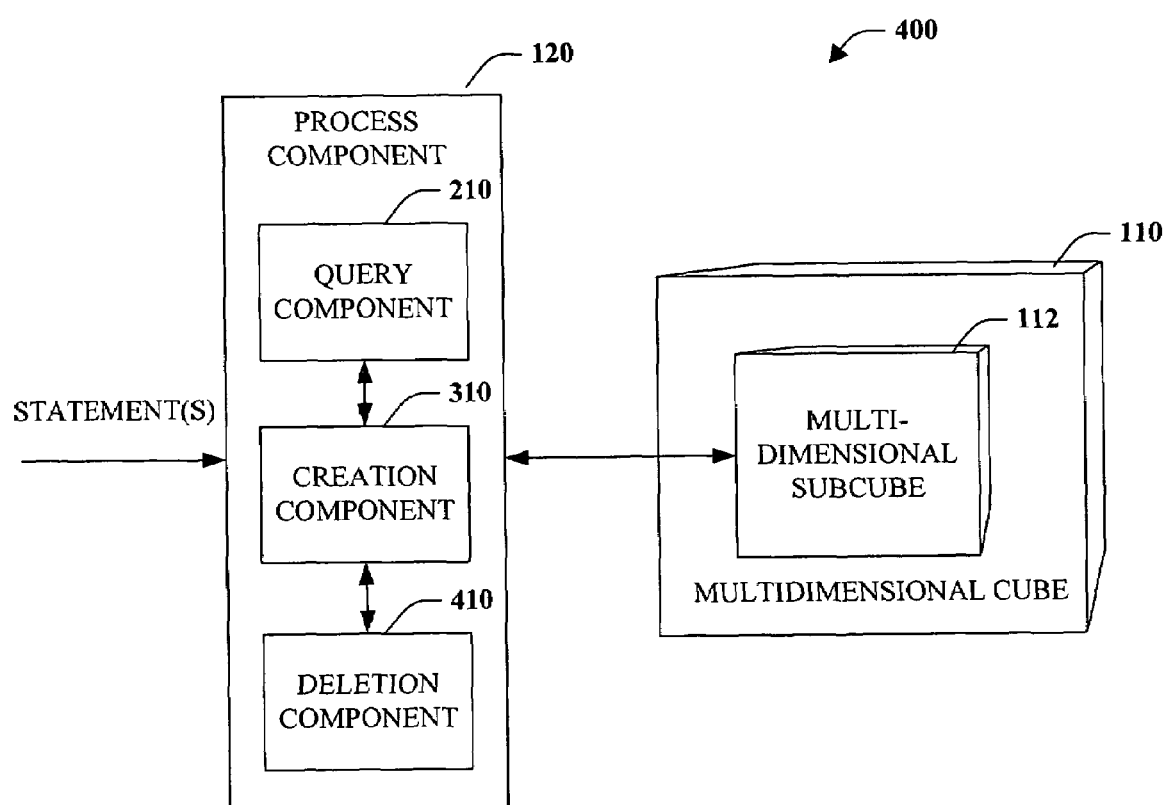
FIG. 4 is a block diagram of a multidimensional cube interaction system including a deletion component in accordance with an aspect of the subject invention.

FIG. 4 depicts a multidimensional cube interaction system 400 in accordance with an aspect of the subject invention. Similar to previously described systems, system 400 can include a multidimensional cube 110, a subcube 112, process component 120 comprising a query component 210, and creation component 310. Cube 110 is a multidimensional structure for storing and organizing data. Subcube 112 defines a smaller subset of data cells then the cube 110. Query component 210 is operative to assist process component 120 in receiving, executing, and returning results of query on cube 110 and/or subcube 112. Creation component 310 aids process component 120 by creating subcubes based on received statements or expressions. According to an aspect of the subject invention, creation component 310 can create nested subcubes. In addition to the aforementioned components, system 300 and more particularly processor component 120 can also include a deletion component 410. Deletion component 410 can remove or drop a created subcube 112. A subcube 112 can be dropped by deletion component 410 upon receipt of a statement, expression, or command to do so. Such a statement can take the form of Drop <subcubeName>. Deletion component 310 can effectuate such a drop or deletion in one of at least two ways. First, drop can restore or pop to a previous version of the subcube. Additionally or alternatively, a deletion can drop all subcubes and thereby restore the main cube 110. The incremental drops or deletions can be accomplished by the second deletion mechanism, but only by recreating the subcubes. For example assume the following three subcubes are defined on the an exemplary sales cube as follows:

Create Subcube Sales As Select subcube-expr-1 On Columns From Sales;
Create Subcube Sales As Select subcube-expr-2 On Columns From Sales;
Create Subcube Sales As Select subcube-expr-3 On Columns From Sales;

The only way to go back to subcube-expr-2 is to execute the following series of commands:
Drop Subcube Sales;
Create Subcube Sales As Select subcube-expr-2 On Columns From Sales;
Create Subcube Sales As Select subcube-expr-3 On Columns From Sales;

Furthermore, it should be appreciated that deletion component 410 can interact with one or more of query component 210 and creation component 310 to effect automatic deletion of query subcubes. Recall that such subcubes can be created in response to a subselect statement and should be deleted after execution and return of the query results.

Figure 5:
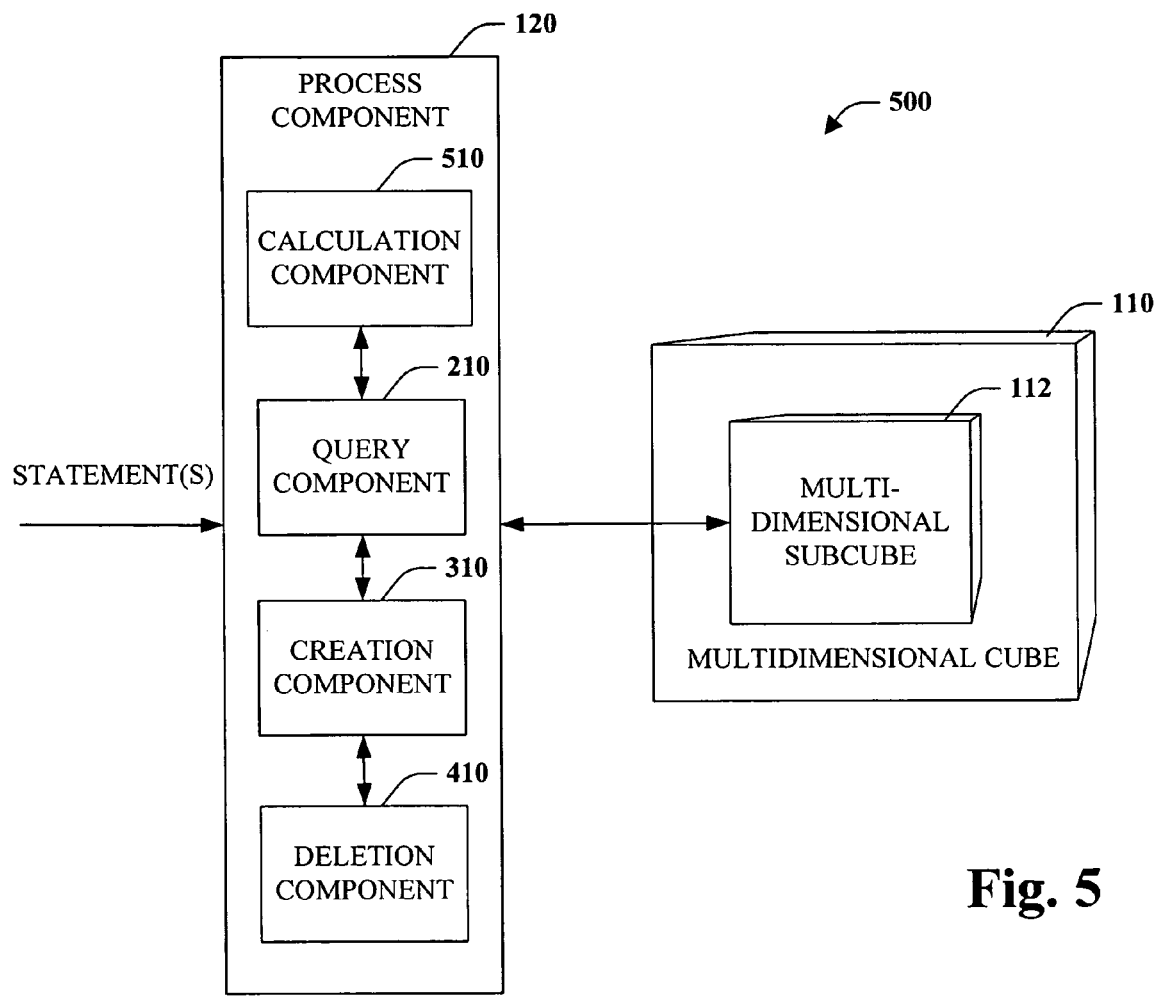
FIG. 5 is a block diagram of a multidimensional cube interaction system in including a calculation component in accordance with an aspect of the subject invention.

FIG. 5 depicts a multidimensional cube interaction system 500 in accordance with an aspect of the invention. System 500 includes a multidimensional cube 110, a subcube 112, and a process component 120 comprising query component 210, a creation component 310, a deletion component 410 and a calculation component 510. As described previously, multidimensional cube 110 is a multidimensional structure to facilitate, among other things, organization, retrieval and analysis of data. Subcube 112 is a structure defining a subset of cube 110. Creation component 130 can generate one or more subcubes 112 within a cube 110. Query component 120 can execute queries on the cube 110 and/or one or more subcubes and return results. Deletion component 310 can remove or drop created subcubes 112. Calculation component 410 facilitates creation and evaluation, in conjunction with query component 210, of calculated members or measures with respect to cube 110 and/or subcube 112. Calculated members or measures are cube members whose value is calculated at run-time based on the expression specified for the calculated member. Such an expression can include cube data, arithmetic operators, and/or functions, among other things. A calculated member can be created base on a received statement, and the expression stored in cube 110 by calculation component 510. For example, the received statement can be of the form, Create measures.x As <expression>. The expression can be stored in the cube while the results of the executed expression stored in memory.

The calculated members or measures can be evaluated upon selection or query by calculation component 510 alone or in conjunction with query component 210. However, evaluation can differ based upon whether the measures are contingent or non-contingent. Calculations defined outside the subcube can be termed non-contingent with respect to the subcube. That is, the result of the calculation does not change as the space is restricted. Calculations defined inside the subcube are contingent, meaning the result is evaluated in the context of the subcube in which it is defined. For example, the following two sets of statements can generate different results for the count of states inside and outside the subcube.
(1) Select measures.a from (with member measures.a as count(Customer.State.members)
Select({Customer.State.WA, Customer.State.OR},*) on) from sales)
(2) with member measures.a as count(Customer.State.members)
Select measures.a from (Select ({Customer.State.WA, Customer.State.OR},*) on 0 from sales.

Statement (1) is non-contingent and thus the value of measures.a would be the number of states defined by the cube, for instance all fifty states. Statement (2) includes a cube subselect limiting the cube to the states of Washington and Oregon. Accordingly, the value of measures.a of statement (2) would be two corresponding to the two states of the query subcube.

Session calculations created outside the subcube can be considered non-contingent with respect to space inside or outside the subcube. Session calculations created inside the subcube can be considered contingent on the subcube. Consider the following exemplary statements:
Create measures.x as <expression>
Create subcube Sales as select (Country.Canada,*) from sales
Create measures.y as <expression>
Select measures.x, measures.y on 0 from sales.

In this instance, x is non-contingent because it was created before or outside the subcube. By contrast, y is contingent, as it was created after or inside the subcube space.

It should be noted that these general rules regarding contingency could lead to erroneous results in practice. For example, with session calculations in particular, statements may be generated, which are prone to error as a statement author may not be able to easily recognize when something is inside or outside a subcube scope. Thus, if a statement explicitly references something outside the bound of a subcube then that value outside the subcube can be received in accordance with an aspect of the invention. This makes calculations via calculation component 510 more powerful and useful in that both cube and subcube data can be employed in calculations. Furthermore, returning values explicitly referenced outside a subcube can ensure correct calculations. For example, if a calculation dealt with comparing a current year's sales to a previous year's sales and the previous year's sales were outside the cube, the values outside the cube will be utilized in the calculations to ensure the correct calculations. Otherwise, an error could be generated or incorrect data could be employed in the calculation leading to erroneous results.

Figure 6:
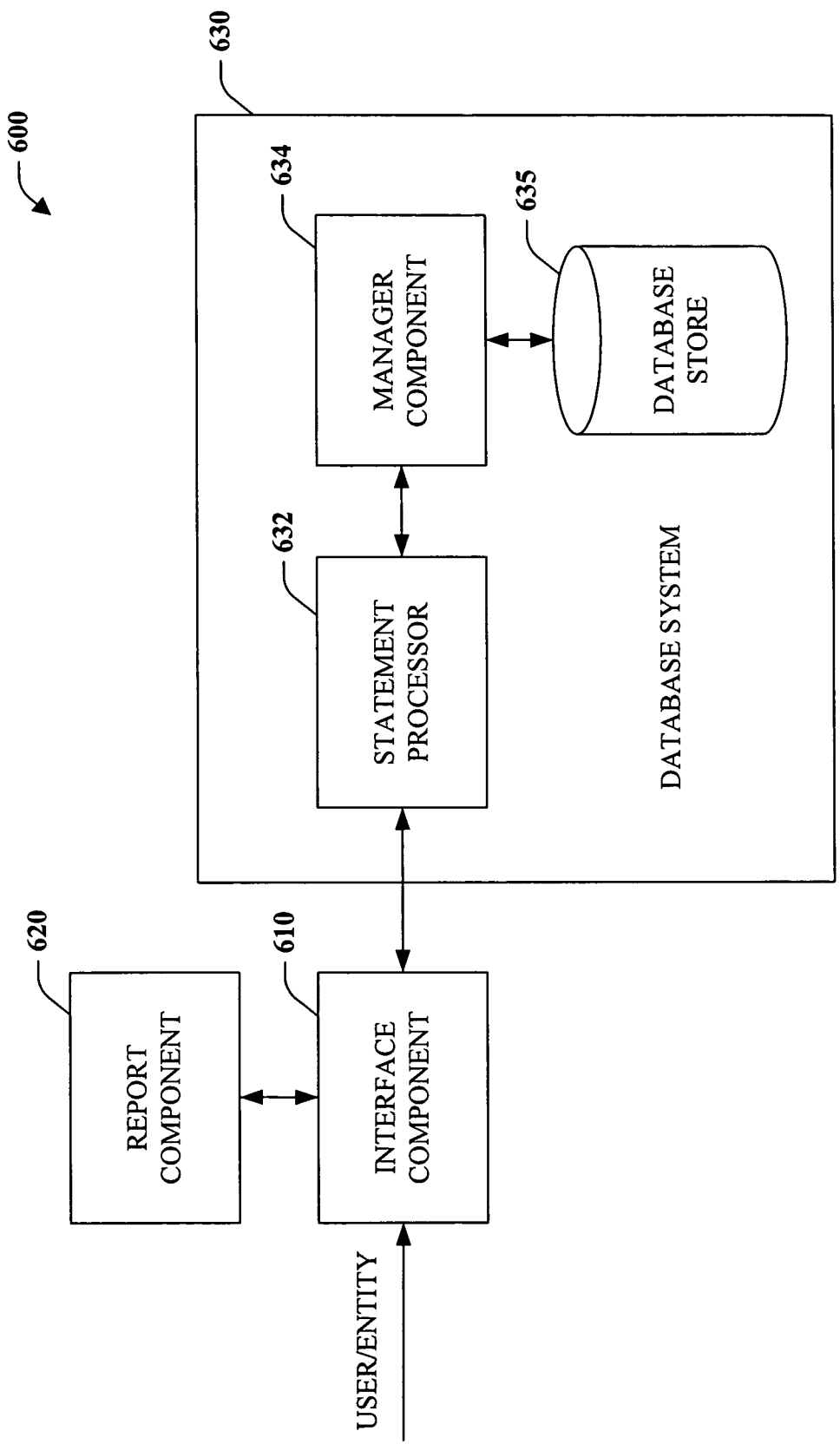
FIG. 6 is a block diagram of a database management environment in which aspects of the subject invention can be incorporated.

FIG. 6 depicts an exemplary database environment 600 in which aspects of the subject invention can be incorporated. Interface component 610 is communicatively coupled to database system 630. Interface component 610 can receive input from a user or other entity and return data back to the user or entity. In particular, the interface component 610 can receive statements or query expressions such as MDX expressions and return results, if any, that correspond to the received input. According to a specific aspect of the invention, a report component 620 can interact with interface component 610. The report component 620 can generate reports. Hence, it can query database system 630 via interface 620 to receive data to populate the reports it generates. Interface component 610 can interact with database system 630 via statement processor component 632. Statement processor 632 can receive statements such as query language statements (e.g., MDX) from interface component 610 and process such statements. The functionality described with respect to the process component 120 of FIGS. 1-5 can be incorporated into the statement processor component 632. The statements received by statement processor component 632 can be broke down and translated into instructions the manager component 634 can comprehend. Once translated, these instructions can be transmitted to manager component 634. Manager component 634 can provide numerous functions including interacting with the database 635 or a file system associated therewith (not shown). The database 635 includes an organized collection of persistent data. In accordance with an aspect of the invention, the database 635 can be a multidimensional database comprising one or more data cubes. However, database 635 can be a relational database that includes an addition layer or component such that the multidimensional model can be executed over a relational database. In addition to interacting with database 635, manager component 634 can perform a myriad of other functions including but not limited to integrity enforcement, security, backup and recovery, and concurrency control. Integrity enforcement can concern making sure updates to the database do not violated constraints. Security pertains to ensuring that users and or other entities are able to access only appropriate data thereby implementing a security policy. Backup and recovery concerns saving appropriate checkpoints or maintaining a copy of the database such that upon failure or error the database can be rolled back to some time prior to the error or failure. Concurrency control pertains to ensuring proper transaction processing.

The aforementioned systems have been described with respect to the interaction between several components. Furthermore, for purposes of clarity and simplicity, a number of systems were provided and described to emphasize an aspect of the subject invention. It should be appreciated that such systems can include those components specified therein, some of the specified components, and/or additional components specified in other systems. Additionally, it should be noted that one or more components may be combined into a single component providing aggregate functionality or divided into several sub components. The components may also interact with one or more other components not specifically described herein but known by those of skill in the art.

Furthermore, as will be appreciated by artisans of ordinary skill in this field, various portions of the disclosed systems above and methods below may include or consist of artificial intelligence or knowledge based components sub-components, processes, means, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as well as efficient.

In view of the exemplary systems described supra, methodologies that may be implemented in accordance with the present invention will be better appreciated with reference to the flow charts of FIGS. 7-10. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
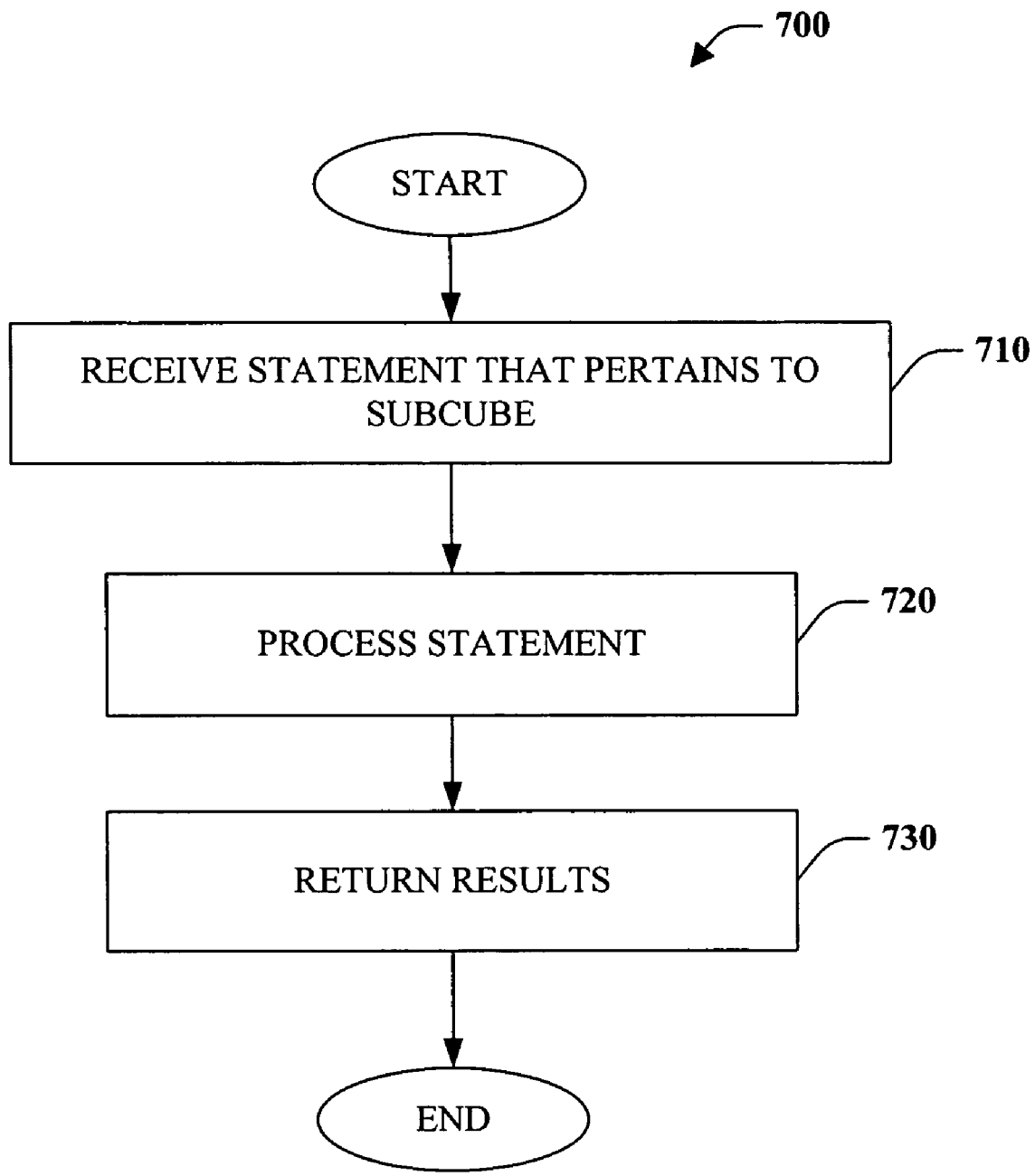
FIG. 7 is a flow chart diagram of a multidimensional database methodology in accordance with an aspect of the subject invention.

Turning to FIG. 7, a multidimensional database methodology 700 is illustrated in accordance with an aspect of the subject invention. At reference numeral 710, a statement is received that pertains to a subcube. The statement can be a multidimensional expression (MDX) statement. The statement can include commands or instructions to create a subcube or delete a subcube, for instance Create subcube <Subcubename> as <select statement> or Drop Subcube <Subcubename>. Additionally, such received statements can include queries of a subcube. The queries are stylized questions related to data identified by a subcube. At 720, the statements are processed. The particular processing is dependent on the statement. For example, if the statement is a create subcube the processing can involve creation of a subcube. Alternatively, if the statement is a delete subcube statement then the processing would involve dropping or removal of the subcube. At 730, results can optionally be returned. For instance, the results can include an acknowledgement that the statement was processed correctly or an error message.

Figure 8:
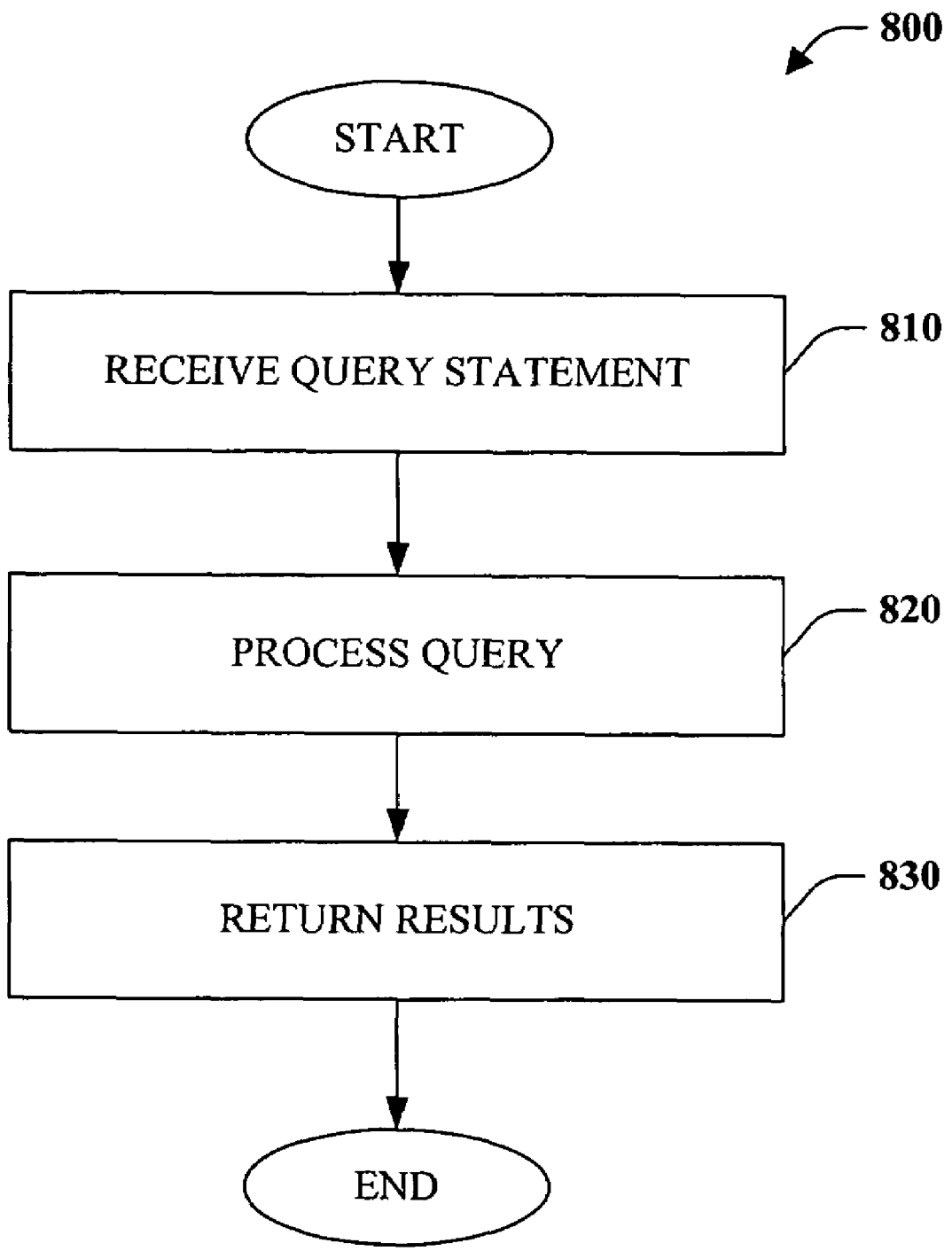
FIG. 8 is a flow chart diagram of a multidimensional database query methodology in accordance with an aspect of the subject invention.

FIG. 8 depicts a multidimensional database query methodology 800 in accordance with an aspect of the subject invention. At reference numeral 810, a query statement is received. The query statement can include a select statement. According to a particular aspect of the invention, the query statement can be directed toward retrieving data from a subcube. The select statement can be utilized to select particular cells or tuples from the subcube. Such query statements can take a myriad of forms. For example, a subcube can be defined and queried in a single statement. A subselect statement can include nested select statements where at least one defines the subcube and one specifies a query thereon. Furthermore, a subcube could be define specifically in a where clause, where a set of one or more cells are identified, for instance. Still further yet, a subcube can be defined prior to the query and directly referenced (e.g., Select <expression> from <subcube> . . . ) or automatically referenced as a session subcube. In accordance with an aspect of the invention, statements can be defined in accordance with the following Backus Naur Form (BNF) notation identifying an exemplary syntax for select statements that can be received. Optional items are surrounded by brackets "[ ]."

```
select_statement:==
   [WITH [<calc_clause> ...]]
   SELECT [<axis_spec> [, <axis_spec> ...]]
   FROM [<identifier> | (< sub_select_statement >)]
   [WHERE <expression>]
   [[CELL] PROPERTIES <cellprop> [, <cellprop> ...]]
   < sub_select_statement > =
   SELECT [<axis_spec> [, <axis_spec> ...]]
   FROM [<identifier> | (< sub_select_statement >)]
   [WHERE <expression>]
```

At 820, the received query is processed. Such processing involves retrieval of cube cells identified by the query from a persistent database store. Furthermore, such processing could involve evaluation of a calculated member or measure. At 830, the retrieved results are returned. Such results can be returned to the querying entity or application.

Figure 9:
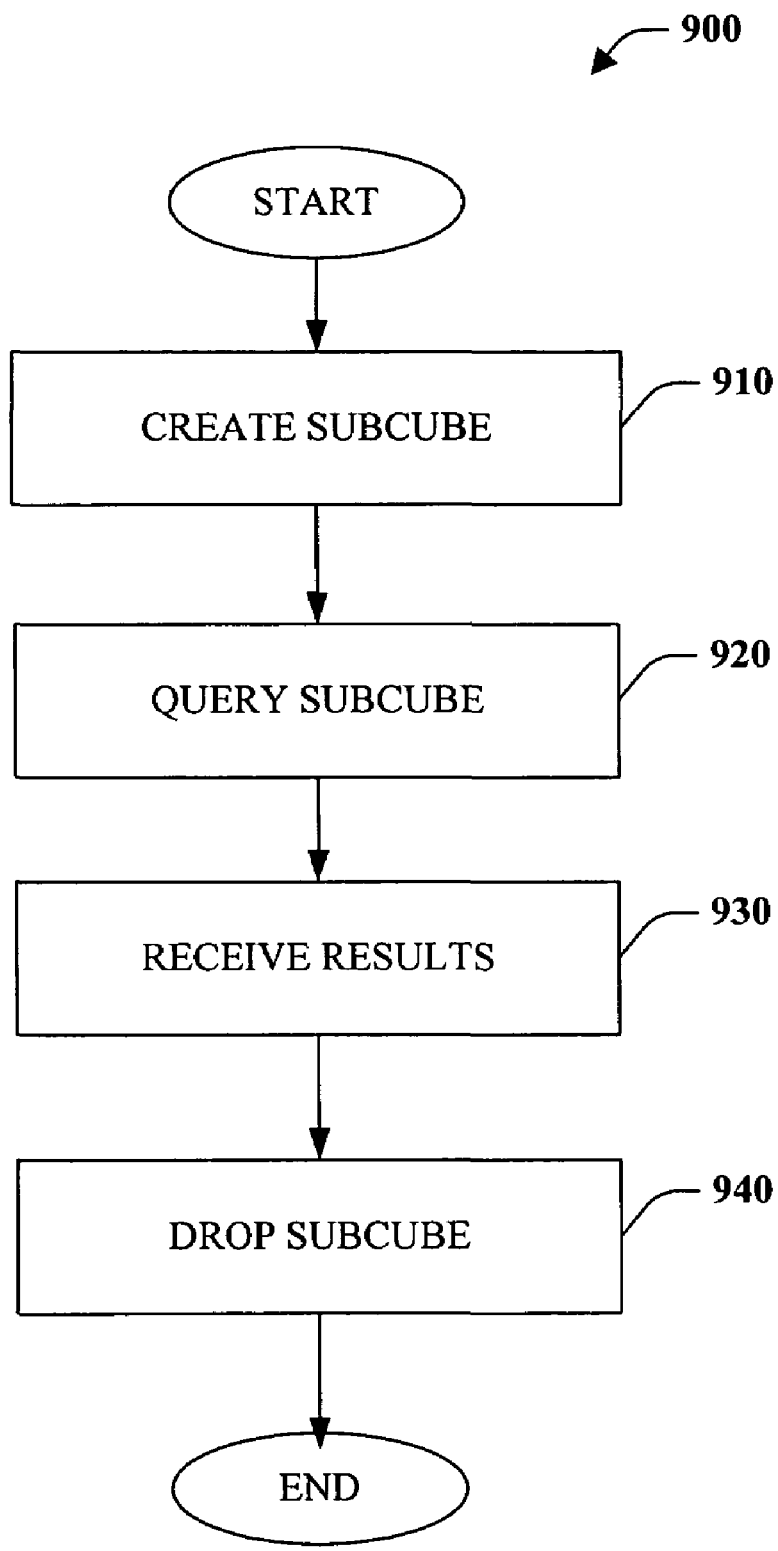
FIG. 9 is a flow chart diagram of a database interaction methodology in accordance with an aspect of the subject invention.

FIG. 9 illustrates a database interaction methodology 900 in accordance with an aspect of the subject invention. At 910, a subcube is created. A subcube is a subset of a multidimensional cube's space. More specifically, the subcube is a collection of tuples that restricts the space for subsequent statements. The subcube can be expressed as a cross join of sets of attribute hierarchies. The subcube can be generated in response to a statement defining the subcube. A subcube can be defined utilizing a select statement in accordance with an aspect of the invention. For example, a creation statement can be specified that includes a select statement such as: Create subcube <SubcubeName> as <select statement>. Furthermore, it should be appreciated that more than one subcube can be created and multiple cubes can be nested within one another to limit the cube scope further. At 920, a subcube is queried. This can be accomplished by specifying a select statement on the subcube, for example Select <expression> from <subcube>. It should also be appreciated that both creation of a subcube and querying the subcube can be combined into a single statement or command. In other words, subcube creation can be in-lined with the query. In one implementation, select statements can be nested at least one defining the subcube and another for querying the subcube. In another implementation, the where clause in a query select statement can define the subcube by identifying subcube cells or tuples. The where clause defined subcube does not have to be a well shaped. Stated differently, the subcube does not have to be expressed as the cross join of attribute hierarchy members. Other implementations are contemplated and considered with the scope of the subject invention. At 930, the results of the subcube query can be received. At 940, the created subcube can be dropped. As per a query subcube, such as one that is in-lined in with a query, the subcube can be automatically dropped after the query is executed. By contrast, a session subcube will remain until specifically deleted. Accordingly, a command or statement can be generated to delete or drop a subcube, for example Drop <subcubeName>. If there are multiple subcubes such as nested subcubes, each subcube can be deleted incrementally or all the subcubes can be deleted at once. Incremental deletion enables subsequent statements to be evaluated with respect to the scope of the next subcube in the hierarchy. Hence, a cube drop can broaden the scope beyond the scope of the subcube being dropped but within the scope of the subcube within which the dropped cube was nested.

Figure 10:
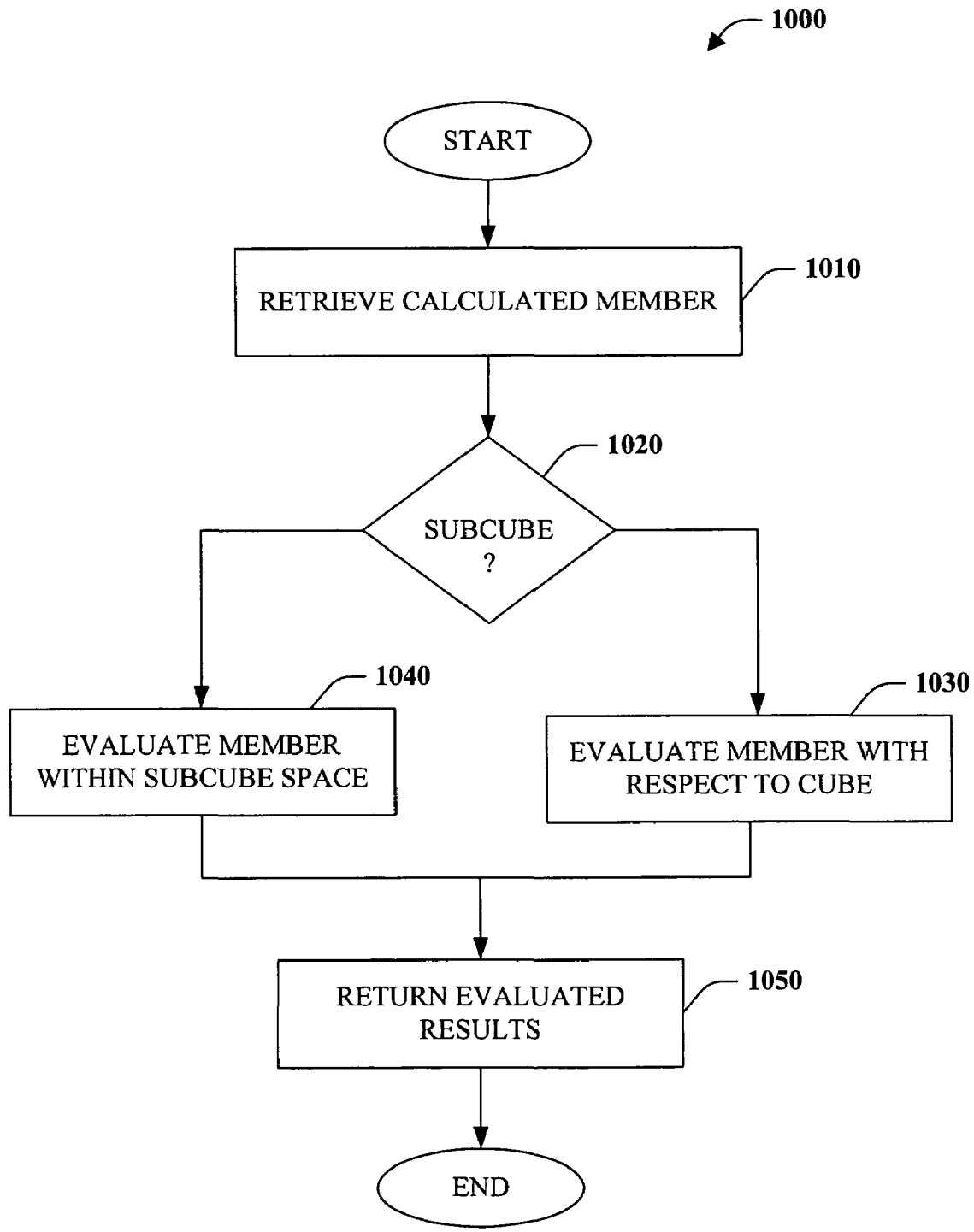
FIG. 10 is a flow chart diagram of a member evaluation methodology in accordance with an aspect of the subject invention.

FIG. 10 depicts a member evaluation methodology 1000 in accordance with an aspect of the subject invention. More specifically methodology 1000 demonstrates how calculated members as well as other functions (e.g., calculated measures, cells...) are evaluated on a multidimensional database that employs subcubes. At reference number 1010, a calculated member or measure is received or identified. A calculated member is a dimension member whose definitions are stored and evaluated at runtime. A calculated member in the measures dimension can be referred to as a calculated measure. At 1020, a determination is made as to whether a subcube exists. A subcube defines a particular range of cells or dimension ranges. If is determined not to exist at 1020, then at the calculated member or other function is evaluated with respect to the entire cube at 1030. The method can then proceed to 1050 where the evaluated results are returned. However, if at 1020 a subcube does exist, then at 1040 the calculated member or other function is evaluated within the defined subcube space. The evaluated results can then be returned at 1050. The returned results can be stored in memory or stored in a data cell. By way of example, assume a calculated member is aggregating the sales from the sales of each state. The cube defines sales amongst all fifty states, but if a subcube exists that limits the states to Washington and Oregon, then the sales will be evaluated with respect to only Washington and Oregon rather than all fifty states. It should also be appreciated that in accordance with an aspect of the invention calculated member, measure or cell expressions that explicitly reference values that are outside the scope of the subcube will be retrieved to ensure correct evaluation of the expression.

Figure 11:
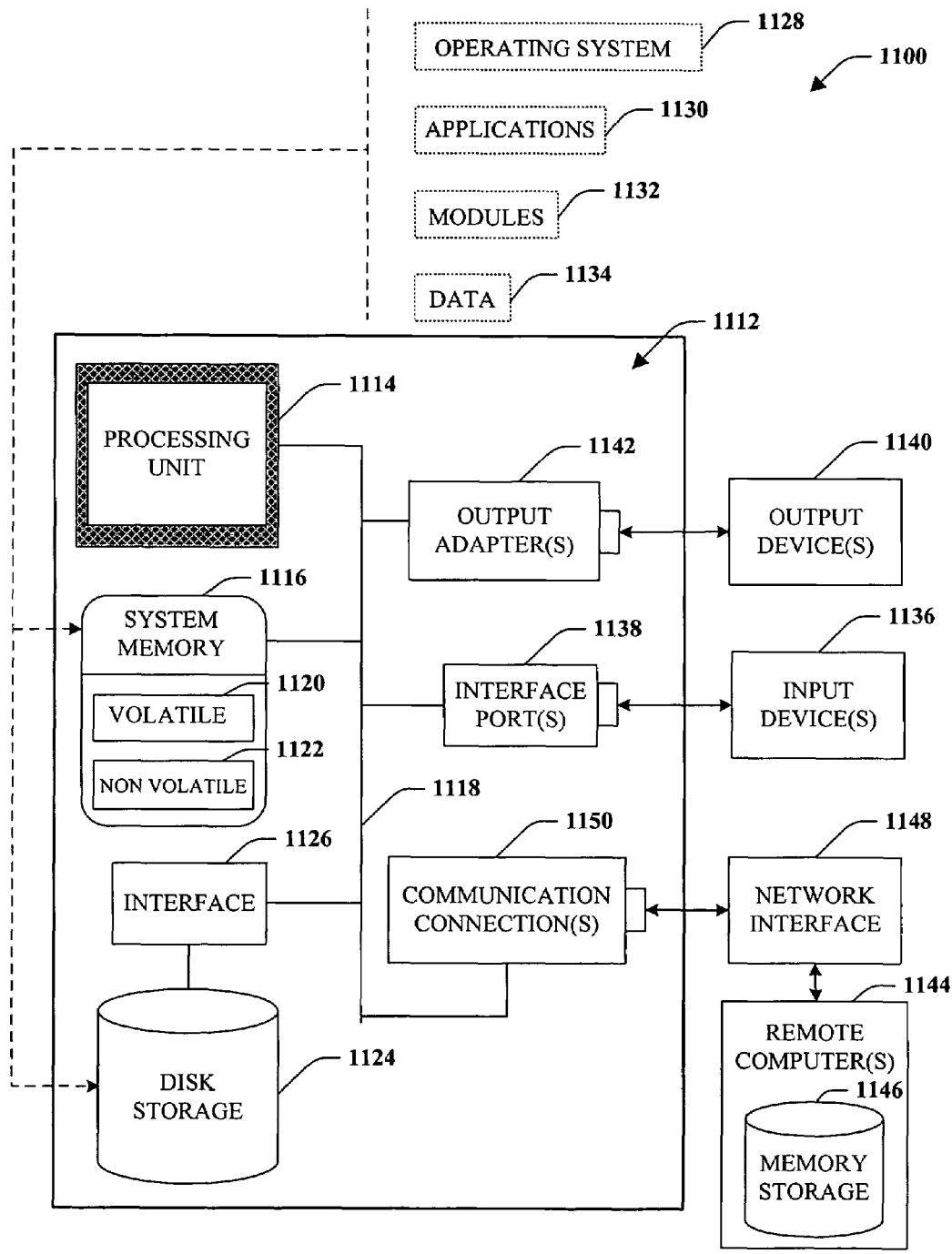
FIG. 11 is a schematic block diagram illustrating a suitable operating environment in accordance with an aspect of the present invention.
Figure 12:
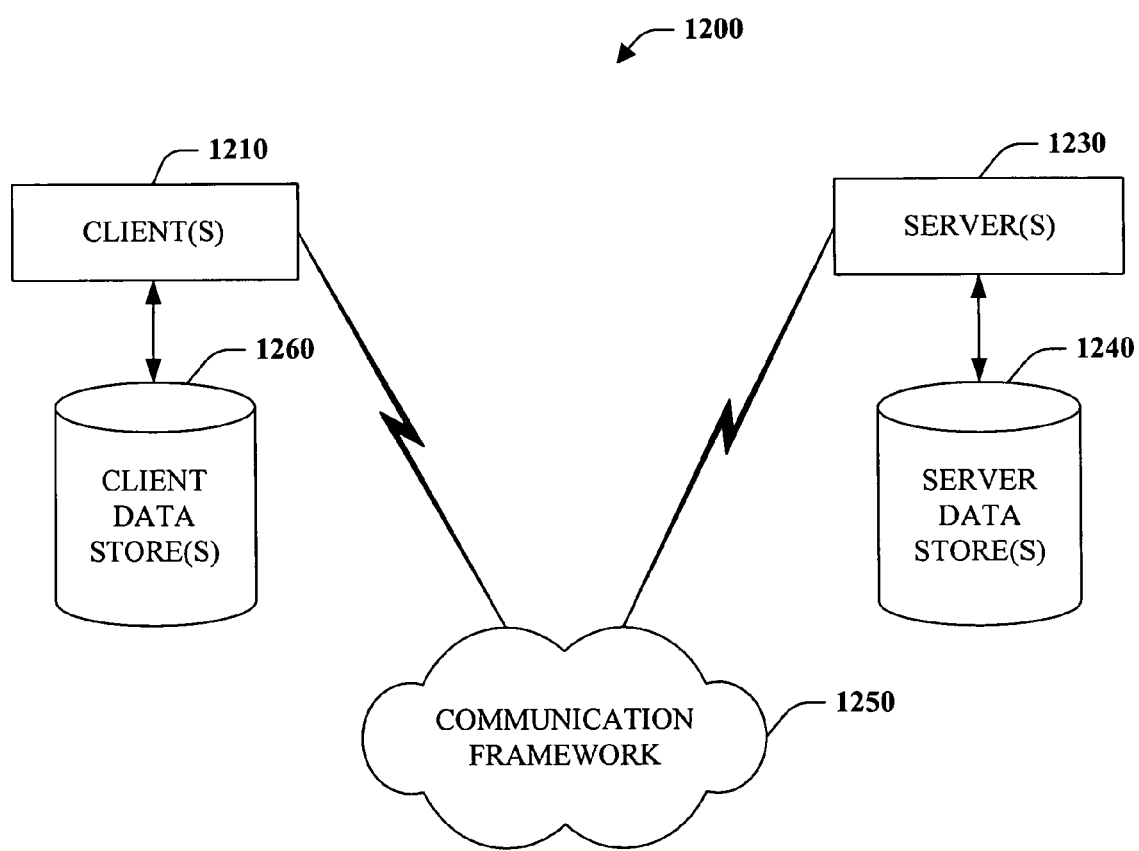
FIG. 12 is a schematic block diagram of a sample-computing environment with which the present invention can interact.

In order to provide a context for the various aspects of the invention, FIGS. 11 and 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example disk storage 1124. Disk storage 4124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The server(s) 1230 can house threads to perform transformations by employing the present invention, for example. One possible communication between a client 1210 and a server 1230 may be in the form of a data packet transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s)

1230 are operatively connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A method of multidimensional data interaction comprising:
   receiving a first statement defining a first subcube, the first subcube defining a subset of a multidimensional cube;
   creating the first subcube in response to the first statement;
   receiving a second statement that evaluates against the first subcube and defines a second subcube, the second subcube defining a subset of the first subcube;
   creating the second subcube in response to the second statement, all subsequent received queries evaluating on the second subcube until deletion of the second subcube;
   receiving a multidimensional database query;
   executing the query on the second subcube;
   returning results of the query;
   receiving a first delete statement that executes to delete the second subcube, deletion of the second subcube restoring the first subcube such that subsequent received queries are evaluated on the first subcube until deletion of the first subcube; and
   receiving a second delete statement that executes to delete the first subcube, deletion of the first subcube facilitating evaluation of subsequent received queries against the multidimensional cube.

2. The method of claim 1, further comprising defining a subcube prior to receiving and executing one or more queries thereon.

3. The method of claim 2, further comprising defining multiple nested subcubes, each subsequent nested subcube further limits the multidimensional data defined by the previous subcube.

4. The method of claim 2, defining a subcube comprises restricting the subspace of a cube or other subcube utilizing a select statement.

5. The method of claim 1, further comprising creating a subcube and specifying a query thereon using a single statement.

6. The method of claim 3, deleting a subcube comprises at least one of restoring a previous nested subcube, if available, or reverting to an unrestricted cube.

7. The method of claim 1, executing the query comprises executing a calculated member, the value is computed based on the data defined by the subcube on which the query evaluates.

8. The method of claim 7, executing a calculated member comprises retrieving data outside the subcube on which the calculated member executes.

9. A computer readable storage medium having stored thereon computer executable instructions for carrying out the method of claim 1.

* * * * *